(12) United States Patent
Hannewald et al.

(10) Patent No.: US 6,400,144 B1
(45) Date of Patent: Jun. 4, 2002

(54) MAGNETIC POSITION SENSOR ON A COMMON SUPPORTING ELEMENT

(75) Inventors: Thomas Hannewald, Griesheim; Wolfgang Sauerschell, Oberursel; Andreas Wehner, Schmitten; Peter Wiese, Königstein, all of (DE)

(73) Assignee: Mannesmann VDO AG, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/488,137

(22) PCT Filed: Jul. 8, 1998

(86) PCT No.: PCT/EP98/04236
§ 371 (c)(1),
(2), (4) Date: May 18, 2000

(87) PCT Pub. No.: WO99/05475
PCT Pub. Date: Feb. 4, 1999

(30) Foreign Application Priority Data

Jun. 6, 1919 (DE) .......................................... 198 25 433
Jul. 23, 1997 (DE) .......................................... 197 31 554

(51) Int. Cl.$^7$ .............................. G01B 7/30; G01B 7/14; F02D 9/00
(52) U.S. Cl. .............................. 324/207.25; 324/207.2; 324/207.22
(58) Field of Search ......................... 324/207.2, 207.25, 324/207.22, 207.21, 207.16; 338/32 H, 32 R (56) References Cited

U.S. PATENT DOCUMENTS

| | | | |
|---|---|---|---|
| 4,914,389 A | | 4/1990 | Juds |
| 5,444,369 A | * | 8/1995 | Luetzow .................. 324/207.2 |

FOREIGN PATENT DOCUMENTS

| | | |
|---|---|---|
| DE | 1264 585 | 3/1968 |
| DE | 1276346 | 8/1968 |
| DE | 1548 591 | 3/1970 |
| DE | 2650499 C2 | 5/1977 |
| DE | 40 08 141 C2 | 9/1990 |
| DE | 94 06 788 | 8/1994 |
| DE | 197 00 046 A1 | 7/1998 |
| EP | 0578 299 A1 | 6/1993 |
| EP | 0670472 A1 | 9/1995 |
| GB | 2308 891 | 7/1997 |

* cited by examiner

Primary Examiner—Walter E. Snow
(74) Attorney, Agent, or Firm—Mayer, Brown & Platt (57) ABSTRACT

The invention relates to a magnetic position sensor in the case of which at least two stator elements are arranged in a magnetic field and a magnetic field probe is located in the measuring air gap between the stator elements, a means tracking a moving object being arranged parallel to the plane defined by the stator elements. A magnetic position sensor which can be produced simply and cost-effectively has a stator element and a magnetic field probe which are arranged on a common supporting element.

18 Claims, 6 Drawing Sheets

MAGNETIC POSITION SENSOR ON A COMMON SUPPORTING ELEMENT

The invention relates to a magnetic position sensor in the case of which at least two stator elements are arranged in a magnetic field and a magnetic field probe is located in the measuring air gap between the stator elements, a means tracking a moving object being arranged parallel to the plane defined by the stator elements.

Hall angle sensors are known which output signals which are proportional to angles. The detection of a rotary movement is performed in this case via a Hall probe which is located in an air gap which is constructed between two stator halves.

A rotor is fixedly arranged on a shaft which, in turn, is connected to the object whose change in position is to be detected.

The stator elements are fastened to the sensor housing. The Hall sensor is arranged in the measuring air gap between the stator elements in a radial fashion relative to the direction of rotation of the shaft, with the result that its electric terminals project beyond the stator elements and are connected to an evaluation circuit on a printed circuit board in order to produce the electric connection.

Disadvantageous in this case is the complicated mounting of the sensor, since it is necessary for the mounting of the stator elements, on the one hand, and the electric connection between the Hall probe and the printed circuit board, on the other hand, to be performed in separate method steps.

A magnetic position sensor of the generic type is disclosed in GB 2 272 060 A, in the case of which at least two stator elements are arranged in a magnetic field, the measuring air gap being bounded by the stator elements, and a magnetic field probe being located in this measuring air gap. In this case, the magnetic field probe is arranged directly, and the stator element is arranged via an auxiliary support, on a common supporting element. This arrangement also requires a complicated mounting, in particular of the stator elements via the auxiliary support on the printed circuit board.

It is therefore the object of the invention to specify a magnetic position sensor which can be produced simply and cost-effectively.

According to the invention, the object is achieved by virtue of the fact that at least one stator element and the magnetic field probe are arranged on a common supporting element.

Particularly when the supporting element is aligned parallel to the radial extent of the stator element, it is possible to reduce the size of the design of the magnetic position sensor and to mount stator elements and the magnetic field probe, in common with other electronic components, on the supporting element in a single method step.

The stator element advantageously has a region, angled off in the direction of the supporting element, for fastening the stator element to the supporting element. The end of said angled-off region can be placed during mounting directly onto the copper cladding of the printed circuit board and be butt-fastened, for example by reflow soldering.

In a further embodiment, adjoining the first angled-off region of the stator element is a second angled-off region which is constructed parallel to the supporting element and is connected thereto. In this variant, the second angled-off region is connected in a planar fashion to the copper cladding of the supporting element, and this permits a better adhesion of the stator to the supporting element. This part, as well, can be fastened simply to the supporting element by means of surface soldering.

In a particularly simple embodiment, the stator element is constructed as a bent stamping which presses directly on the supporting element. The stator element thus constructed has at least one offset which is inserted into the supporting element through an opening therein and fixed there on the opposite side.

The production as a bent stamping permits rivets and washers to be dispensed with, with the result that the mounting process can be automated by means of soldering. The possibilities of configuring the stator elements can also be combined.

In one embodiment, the magnetic field probe is arranged radially offset relative to a shaft in the measuring air gap, the shaft being fixedly connected to the rotor, which is arranged in the axial direction relative to the stator elements.

The rotor is constructed in two parts, each soft-magnetic rotor element having at least one circular segment and the rotor elements being interconnected rigidly rotated with respect to one another, with the result that the circular segment of the first rotor element is situated opposite a segment gap in the second rotor element, the stator elements being arranged between the rotor elements, and a magnet which generates the magnetic field in the axial direction being arranged both between the rotor elements and the stator elements.

The advantage of the invention consists in that the rigid bipartite rotor configuration suppresses the effects of the axial play on the sensor signal, since the two air gaps occurring between the rotor and stator are simultaneously varied in opposite directions and the sum of the air gaps is therefore always constant.

The sum of the two air gaps, which are constructed in the axial direction between the rotor elements and one stator element each, is preferably small compared to the axial extent of the magnet, as a result of which the magnetic flux through the stator is supported.

In one embodiment, the stator elements are likewise constructed to resemble circular segments.

In one development, the outside radius of the circular segment of at least one rotor element is smaller than the outside radius of a stator element. This permits the arrangement of the magnetic field probe parallel to the axis of rotation of the shaft of the sensor in the air gap between the two stator elements. The advantage of this arrangement consists in that the magnet can now be optimally dimensioned, since the axial spacing between the two rotor parts can be varied freely.

Since the angular dependence of the flux guidance is achieved not via the contour or magnetization of the magnet, but by the asymmetric shape of the rotor, the requirements placed on the magnet are minimal.

The magnet need only generate an axially directed field. The latter can be generated optionally by a rotatably mounted permanent magnet or a magnet which is fixed with reference to the stator and which in this case can be embodied either as a permanent magnet or as an electromagnet.

In one development, the magnet is constructed as a permanently magnetic annular magnet.

The stator segments are advantageously arranged in this case always coaxially around the-axis of rotation of the rotor shaft.

The invention permits numerous exemplary embodiments: one of them is to be explained in more detail with the aid of the figures represented in the drawing, in which.

Identical features are marked in the figures with identical reference numerals.

Figure 1:
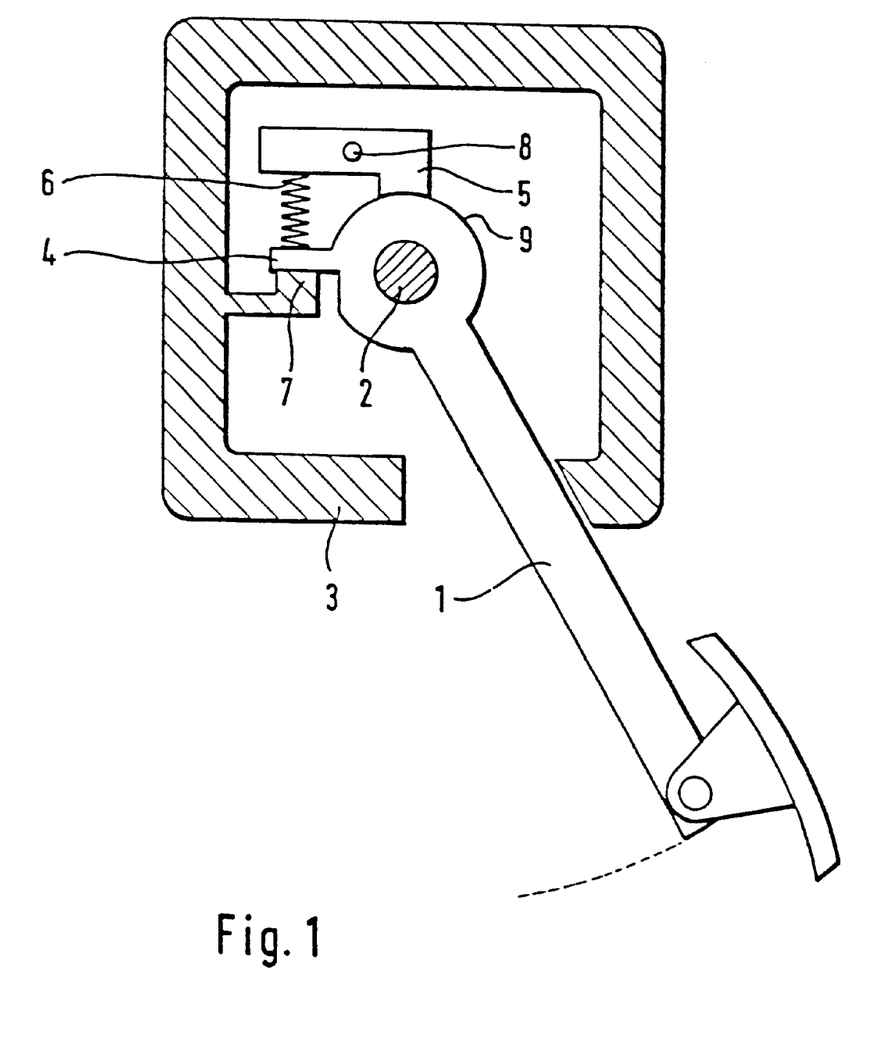
FIG. 1 shows a pedal unit of a motor vehicle.

In accordance with FIG. 1, an acceleration pedal 1, for example a gas pedal of a motor vehicle, is connected in a secure fashion in terms of rotation to the shaft 2 which, for its part, is rotatably mounted in the bearing block 3. The restoring spring 6 is supported, on the one hand, on a lug 4, constructed in one piece with the acceleration pedal 1, and, on the other hand, on a lever 5 which can be rotated about a shaft 8 and bears frictionally with its other end against a rotating surface 9 of the acceleration pedal 1. The result is to form a frictional resistance (hysteresis) opposing the pivoting movement of the acceleration pedal 1 in both directions, unintentional vibrations of the acceleration pedal 1 thereby being largely suppressed.

The action of the restoring spring 6 is limited by an inner stop 7, on which the lug 4 comes to bear when the acceleration pedal 1 is not being operated.

Figure 2:
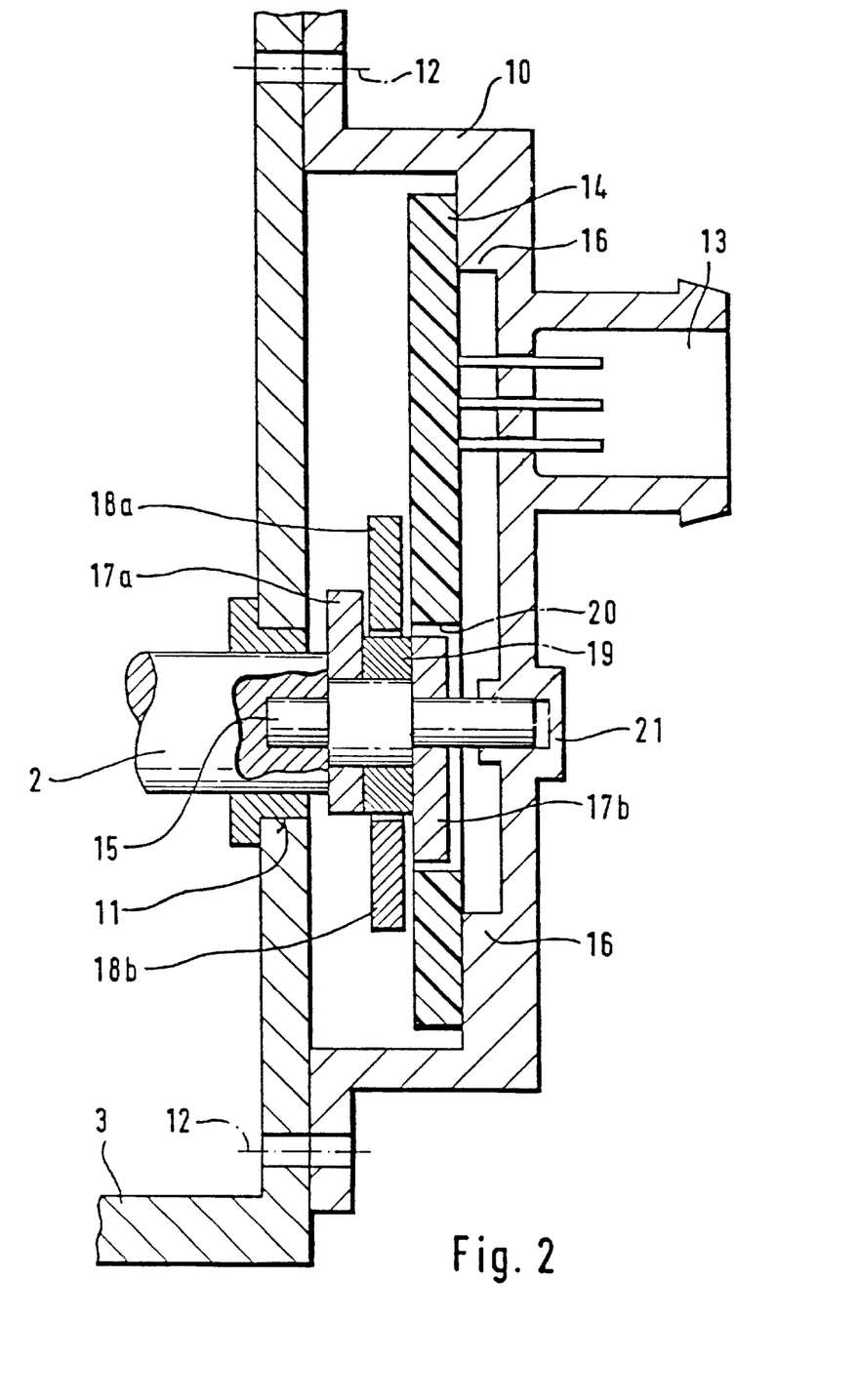
FIG. 2 shows a section through a magnetic position sensor which is arranged on the pedal unit of the motor vehicle.

FIG. 2 represents the arrangement of an angle sensor on the bearing block 3 of the acceleration pedal 1. The housing 10 of the angle sensor is connected to the bearing block 3 via a screw connection 12 (merely indicated).

The housing 10 has a plug-in connection 13, which permits electric connection to the printed circuit board 14, which is arranged inside the housing 10 on the projections 16 of the housing 10.

The shaft 2, guided out of the bearing block 3 through an opening 11, accommodates a non-magnetic shaft 15 which is constructed in stages. Two rotor elements 17a and 17b a first and second rotor element, respectively, are arranged securely in terms of rotation on said nonmagnetic shaft 15, for example constructed as a plastic shaft, in such a way that they axially enclose an annular magnet 19 and two stator elements 18a and 18b. a first and second stator element, respectively. The stator elements 18a and 18b are arranged on the printed circuit board 14. The second rotor element 17b is movably guided through an opening 20 in the printed circuit board 14. The side of the nonmagnetic shaft 15 is guided movably in a receptacle 21 of the housing 10.

The housing 10 is constructed in one piece with the plug-in-connection 13 and the receptacle 21.

Figure 3:
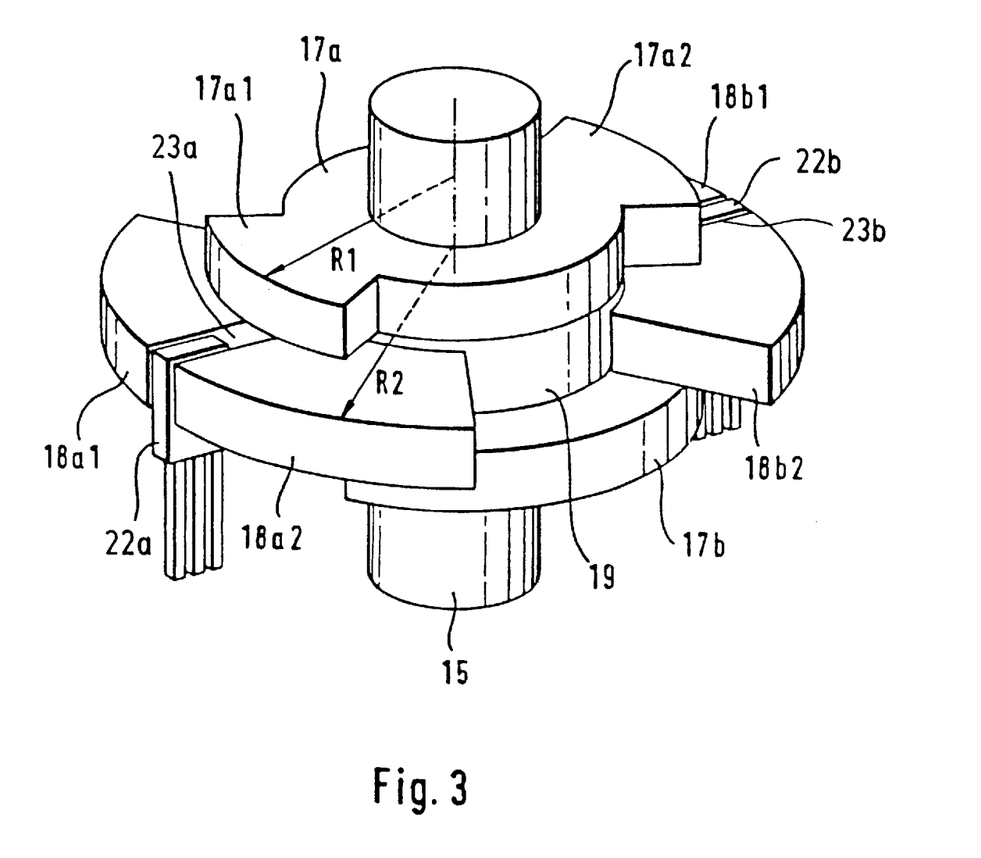
FIG. 3 shows a representation of the principle of the magnetic position sensor.

The principle of the sensor is represented in FIG. 3 and is to be explained below.

The magnet 19 is located between the first and second rotor elements 17a, 17b which are made from soft magnetic material which re rotated by 180° with respect to one another. The rotor elements 17a and 17b are rigidly coupled to one another via the nonplastic shaft 15.

In the simplest case, each rotor element 17a and 17b has two segments (17a1, 17a2) and (17b1, 17b2), respectively, which are arranged opposite one another. The first rotor element 17a has segments 17a1, 17a2 which are displaced by 180° with respect to one another, while the second rotor element 17b likewise has two segments 17b1, 17b2. The rotor elements are magnetically coupled in the direction of the center of rotation. In this arrangement, it is in each case the spacing between two segments 17a1 and 17a2 or 17b1, and 17b2 of rotor elements 17a and 17b, respectively, which are denoted as a segment gap. The two rotor elements 17a, 17b are offset with respect to one another such that a segment gap of the rotor element 17b (one of the spaces between the segments 17b1, and 17b2) is situated opposite the segment 17a1 of the rotor element 17a. The same holds for the segments 17b1, 17b2 of the second rotor element 17b, which are always situated opposite a segment gap of the first rotor element 17a. (one of the spaces between the segments 17a1 and 17b2).

However, it is conceivable that the rotor elements 17a, 17b have N segments. The rotor elements are then offset by 180°/N with respect to one another. As already explained, the width of each wing in this case is correspondingly 180°/N. The periodicity of the signal with respect to the semicircular variant is thereby reduced by 1/N.

The system represented in FIG. 3 has a stator arrangement which comprises a first pair of stator segments which include a first and second stator segment 18a1 and 18a2, respectively, arranged directly juxtaposed. The stator segments 18a1 and 18a2 are arranged between the rotor elements 17a, 17b and form with respect to one another an air gap 23a in which the a magnetic field probe 22a, such as a Hall probre, is arranged axially relative to the nonmagnetic shaft 15.

FIG. 3 shows a redundant system in which, in addition to the first and second stator segments 18a1 and 18a2 already explained, a second pair of stator segments including a third and forth stator segment, respectively. 18b1, 18b2 is also constructed, which is arranged rotated by 180° with respect to the first pair of stator segments 18a1, 18a2. The second pair of stator segments 18b1, and 18b2 also form a measuring air gap 23b, in which a second magnetic field probe 22b is arranged.

In this embodiment, the stator segments 18a1, 18a2, 18b1 and 18b2 are provided with a larger outside radius R2 than the rotor segments 17a1, 17a2 and 17b1, 17b2. The rotor segments have an outside radius R1 which is dimensioned such that the nonmagnetic probes 22a and 22b can be introduced completely into the measuring air gap without having the rotor segment 17a1, 17a2 or 17b1, 17b2 superimposed on them.

The nonmagnetic probes 22a and 22b arranged axially relative to the direction of rotation of the sensor in the measuring air gaps 23a and 23b can now be arranged on one and the same printed circuit board 14.

The magnet 19 can be optimally dimensioned, since the axial spacing between the two rotor elements 17a, 17b can be freely selected.

A simplification in mounting the sensor as a whole is achieved when the segments 17a1 and 17a2 of the first rotor element 17a has a smaller angle than the segment gaps of the second rotor element.

FIG. 3 represents an example in which the rotor segments 17a1 and 17a2 are 57° in width and a redundant signal is generated.

Open regions of 66° here, for example, are produced between the first and second stator pairs.

The rotor element 17a has two segments 17a1, 17a2 of single stator width (57°). The rotor element 17b is of complementary construction, that is to say the segments gaps have an extent which corresponds to the width of the circular rotor segments 17a1, 17a2 of the rotor element 17a.

If the rotor packet, consisting of rotor elements 17a and 17b, is brought into a suitable position which corresponds to ±90° relative to the position represented, said packet can be assembled or dismantled as a whole axially.

It is possible thereby to achieve a substantial simplification in mounting, since the stator side (printed circuit board 14) with stators and electronics can be handled, just like the rotor side (rotor elements 17a, 17b, magnet 19 and shaft 15) as preassembled units.

For example, the rotor side can be preassembled on the non-magnetic shaft 15, which is then pressed onto the shaft 2. The nonmagnetic shaft 15 permits magnetic decoupling of the shaft 2 which can then consist of a soft magnetic material. The shaft also no longer needs to be offset, and this likewise signifies a simplification.

Figure 4:
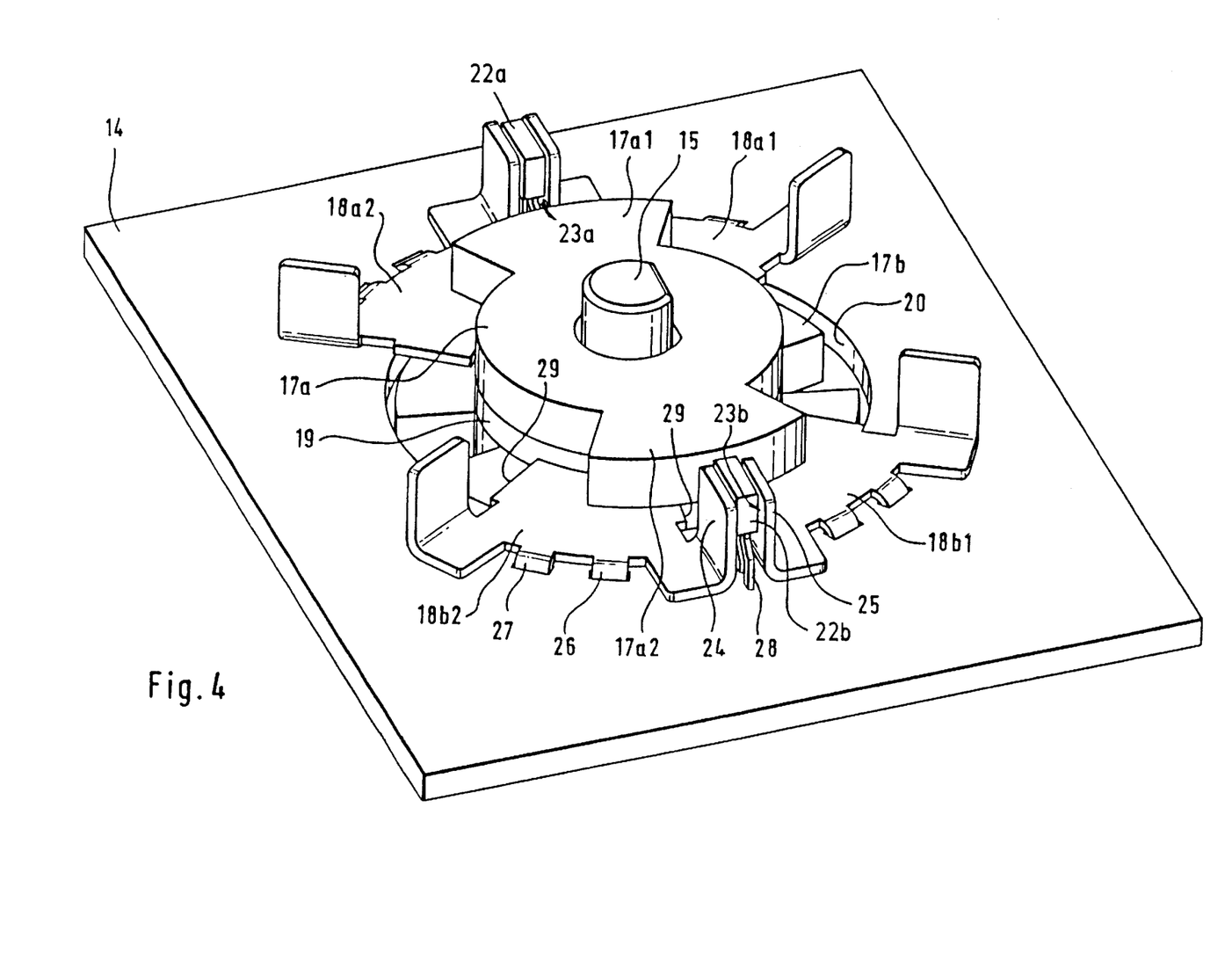
FIG. 4 shows an arrangement of the stator element of the magnetic position sensor on a printed circuit board.

FIG. 4 represents an embodiment of the sensor just described in which the stator segments 18a1 and 18a2 as well as 18b1, and 18b2 rest directly on the printed circuit board 14.

Figure 5:
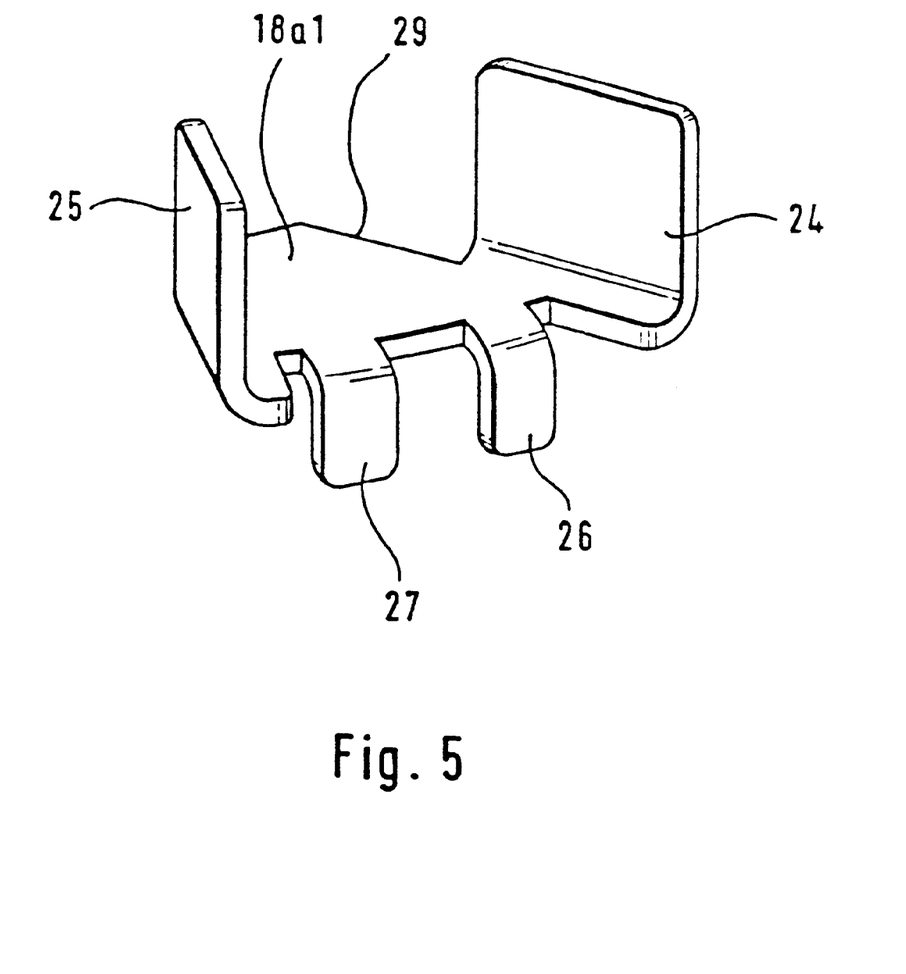
FIG. 5 shows a stator element.

The stator segments 18a1 and 18a2 as well as 18b1 and 18b2 are constructed as bent stampings. Each stator element has a first and a second and angled-off part 24 25, respectively, in each case on its outer segment edges 29 (FIG. 5). Together with the second angled-off part 25 of the stator segment 18b1, the first angled-off part 24 of the stator segment 18b2 forms the measuring air gap 23b in which the magnetic field probe 22b is arranged.

These angled-off parts enlarge the effective measuring surface without the need for the sheet thickness of the stator to be increased. The result of this is that the dimensioning of the magnet 19 can be reduced, the entire sensor thereby having smaller dimensions.

The electric terminals 28 of the magnetic field probes 22a and 22b engage in the printed circuit board 14 and are flow-soldered on the underside of the printed circuit board 14.

A representative stator segment 18a1 is shown in FIG. 5. edge having the largest outside radius R2 shown in FIG. 3) includes two offsets 26, 27 which engage in openings in the printed circuit board 14. The stator segments 18a1, 18a2, 18b1, 18b2 are fastened with the aid of offsets 26, 27 to the printed circuit board 14 by being flow-soldered in one operation simultaneously with the magnetic field probes 22 and further electric switching elements (not further represented) arranged on the printed circuit board 14.

Figure 6A:
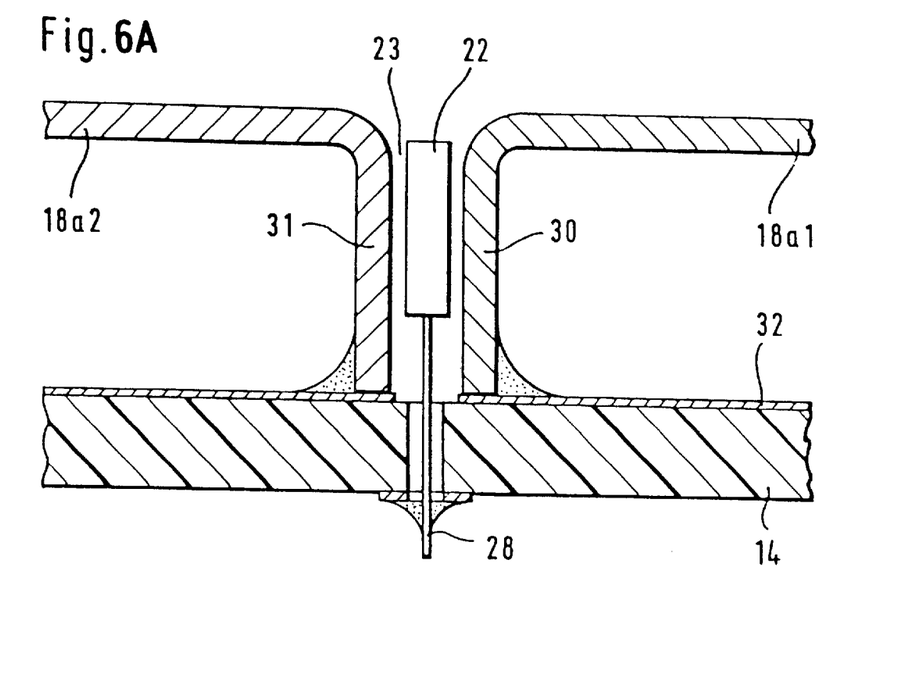
FIG. 6 shows possibilities for fastening the stator elements on the printed circuit board.

Yet further possibilities of fastening the stator segments are represented in FIG. 6. FIG. 6A shows a stator segment 18a1, which has a prescribed spacing from the printed circuit board 14. A first angled-off region 30, angled off perpendicular, of the stator segment 18a1, or a second angled-off region 31 of the second stator segment 18a2 is placed in abutment on the copper cladding 32 of the printed circuit board 14 and connected to the latter by reflow soldering. The angled-off regions 30 and 31 serve in this case simultaneously as a spacer between the stator segment 18a1 and the printed circuit board 14.

Figure 6B:
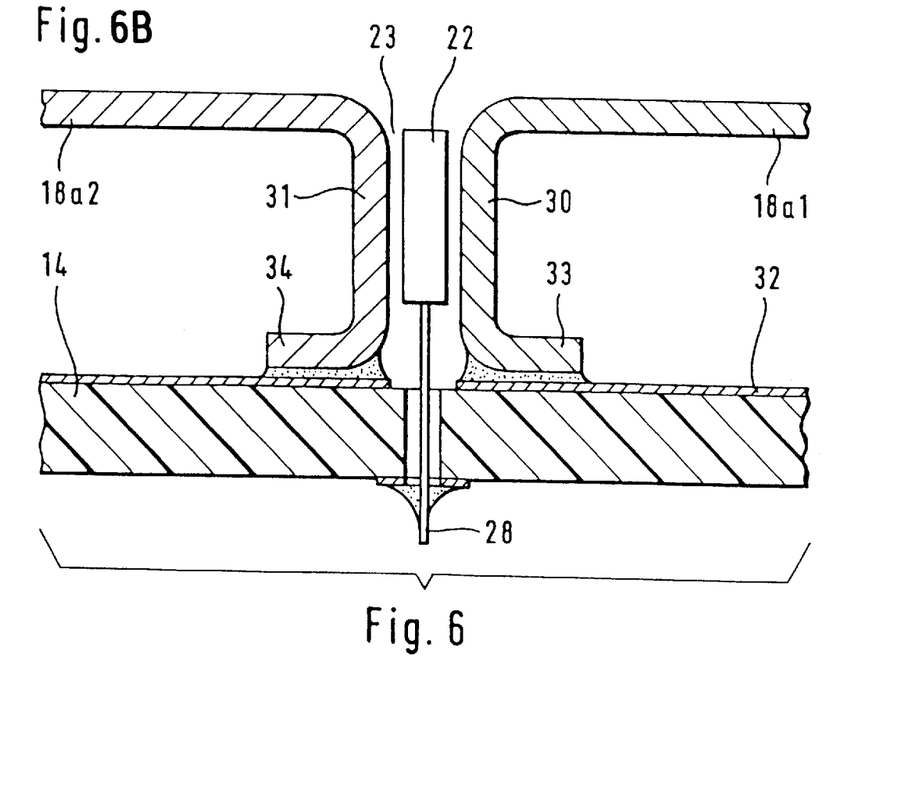

In the variant represented in FIG. 6B, the first angled-off region 30 of the stator segment 18a1 is angled off by 90° and adjoined by a third angled-off region 33 angled off by 90°, which is constructed parallel to the printed circuit board and rests on the latter in a planar fashion and is soldered thereto. The stator element 18a1 forms a U rotated by 90° with the first and third angled-off regions 30 and 33. Likewise, stator segment 18a2 forms a U rotated by 90° with the second and fourth angled-off regions 31 and 34, respectively.

Both in the variant in accordance with FIG. 6A and in the embodiment according to FIG. 6B, the first angled-off parts 30 of each stator segment form with the second angled-off part 31 of the stator segment adjoining parallel thereto the measuring air gaps 23 in which the with magnetic field probes 22 are arranged.

What is claimed is:

1. The magnetic position sensor comprising:
   at least two stator elements which are butt-soldered to the supporting element, wherein the stator elements form an air gap there between, define a plane, are arranged in a magnetic field, and each include a radial extent and a first, a second, a third and a fourth angled-off region;
   a magnetic field probe located in the air gap;
   a means for tracking a moving object arranged parallel to the plane; and
   a common supporting element, wherein the magnetic field probe and at least one of the stator elements is arranged thereon, and wherein the common supporting element is aligned parallel to the radial extent and the stator elements are fastened to the supporting element and the third and fourth angled-off regions are parallel to and connected to the supporting element.

2. The magnetic position sensor as claimed in claim 1, wherein the stator elements are arranged so that the air gap is formed by the first angled-off region of one of the stator elements and the second angled-off region of another one of the stator elements.

3. The magnetic position sensor as claimed in claim 1, wherein
   the stator elements each further comprise at least one offset,
   the supporting element comprises a plurality of openings corresponding to the offsets, wherein each of the offsets are inserted into the corresponding openings and soldered to the supporting element.

4. The magnetic position sensor as claimed in claim 3, wherein the stator elements are a bent stamping which rests directly on the supporting element.

5. The magnetic position sensor as claimed in claim 4, wherein
   the stator elements each further comprise a first angled-off part and a second angled-off part.

6. The magnetic position sensor as claimed in claim 5, wherein the stator elements are arranged so that the gap is formed by the first angled-off part of one of the stator elements and the second angled-off part of the another one of the stator elements.

7. The magnetic position sensor as claimed in claim 1, wherein the means for tracking a moving object further comprises:
   a rotor, wherein the rotor axially encloses the stator elements; and
   a rotor shaft, including an axis of rotation, wherein the rotor shaft is connected to the rotor and is parallel to the magnetic field probe.

8. The magnetic position sensor as claimed in claim 7, wherein the rotor comprises:
   a first rotor element comprising at least a first and second segment;
   a second rotor element comprising at least a third and fourth segment, wherein
   the third and fourth segments form segment gaps there between,
   the rotor elements are rigidly interconnected with respect to one another, so that the first and second segments of the first rotor element are situated opposite the segment gaps in the second rotor element,
   the stator elements are arranged between the first and second rotor elements; and
   a magnet, including an axial extent, which generates the magnetic field in an axial direction, wherein the magnet is arranged between the rotor and the stator elements.

9. The magnetic position sensor as claimed in claim 8, further comprising two gaps which are constructed in the axial direction between the rotor elements and one stator element each, wherein the gaps are small compared to the axial extent of the magnet.

10. The magnetic position sensor as claimed in claim 8, wherein the rotor elements are constructed to resemble circular segments with a first outside radius.

11. The magnetic position sensor as claimed in claim 10, wherein the stator elements include a second outside radius and the first outside radius is smaller than the second outside radius.

12. The magnetic position sensor as claimed in claim 11, wherein the magnet is a permanently magnetic annular magnet.

13. The magnetic position sensor as claimed in claim 12, wherein the permanently magnetic annular magnet is fastened to the rotor shaft.

14. The magnetic position sensor as claimed in claim 13, wherein the stator elements are arranged coaxially around the axis of rotation of the rotor shaft.

15. The magnetic position sensor as claimed in claim 7, wherein the rotor elements together with the rotor shaft can be assembled or dismantled axially as a whole.

16. A magnetic position sensor, comprising:
   at least two stator elements each including a radial extent, a first and a second angled-off region, wherein the stator elements define a plane and are arranged in a magnetic field;
   at least one air gap formed between the first angled-off region of one of the stator elements and the second angled-off region of another one of the stator elements;
   a magnetic field probe located in each of the at least one air gaps;
   a rotor, wherein the rotor comprises:
      a first rotor element comprising at least a first and second segment;
      a second rotor element comprising at least a third and fourth segment, wherein the third and fourth segments form segment gaps there between, the rotor elements are rigidly interconnected with respect to one another, so that the first and second segments of the first rotor element are situated opposite the segment gaps in the second rotor element, the stator elements are arranged between the first and second rotor elements;
      a magnet, including an axial extent which generates the magnetic field in an axial direction, wherein the magnet is arranged between the rotor elements and between the stator elements; and
      a rotor shaft, including an axis of rotation, wherein the rotor shaft is connected to the rotor and is parallel to the magnetic field probe; and
   a common supporting element, wherein the magnetic field probe and at least one of the stator elements is arranged thereon, and wherein the common supporting element is aligned parallel to the radial extent and the stator elements are fastened to the supporting element.

17. A magnetic position sensor, comprising:
   at least two stator elements each including a radial extent, a first, second, third and fourth angled-off region, wherein the third angled-off region adjoins the first angled-off region, and the forth angled-off region adjoins the second angled-off region, wherein the stator elements define a plane and are arranged in a magnetic field;
   at least one air gap formed between the first angled-off region of one of the stator elements and the second angled-off region of another one of the stator elements;
   a magnetic field probe located in each of the at least one air gaps;
   a rotor, wherein the rotor comprises:
      a first rotor element comprising at least a first and second segment;
      a second rotor element comprising at least a third and fourth segment, wherein the third and fourth segments form segment gaps there between, the rotor elements are rigidly interconnected with respect to one another, so that the first and second segments of the first rotor element are situated opposite the segment gaps in the second rotor element, the stator elements are arranged between the first and second rotor elements;
      a magnet, including an axial extent which generates the magnetic field in an axial direction, wherein the magnet is arranged between the rotor elements and between the stator elements; and
      a rotor shaft, including an axis of rotation, wherein the rotor shaft is connected to the rotor and is parallel to the magnetic field probe; and
   a common supporting element, wherein the magnetic field probe and at least one of the stator elements is arranged thereon, and wherein the common supporting element is aligned parallel to and is connected to the third and fourth angled-off regions.

18. A magnetic position sensor, comprising:
   at least two stator elements each including a radial extent, and at least one offset, wherein the stator elements are a bent stamping, define a plane and are arranged in a magnetic field;
   at least one air gap formed between the first angled-off region of one of the stator elements and the second angled-off region of another one of the stator elements;
   a magnetic field probe located in each of the at least one air gaps;
   a rotor, wherein the rotor comprises:
      a first rotor element comprising at least a first and second segment;
      a second rotor element comprising at least a third and fourth segment, wherein the third and fourth segments form segment gaps there between, the rotor elements are rigidly interconnected with respect to one another, so that the first and second segments of the first rotor element are situated opposite the segment gaps in the second rotor element, the stator elements are arranged between the first and second rotor elements;
      a magnet, including an axial extent which generates the magnetic field in an axial direction, wherein the magnet is arranged between the rotor elements and between the stator elements; and
      a rotor shaft, including an axis of rotation, wherein the rotor shaft is connected to the rotor and is parallel to the magnetic field probe; and
   a common supporting element including a plurality of openings corresponding to the offsets, wherein the magnetic field probe and at least one of the stator elements is arranged thereon, and wherein the bent stamping rests directly on the common supporting element and the offsets are inserted into the corresponding opening and soldered to the supporting element.

* * * * *